United States Patent
Golavanov (10) Patent No.: US 8,875,294 B2
(45) Date of Patent: Oct. 28, 2014

(54) SYSTEM AND METHOD FOR CLOUD-BASED DETECTION OF COMPUTER MALWARE

(71) Applicant: Kaspersky Lab ZAO, Moscow (RU)

(72) Inventor: Sergey Y. Golavanov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 29 days.

(21) Appl. No.: 13/749,856

(22) Filed: Jan. 25, 2013

(65) Prior Publication Data

US 2014/0130161 A1    May 8, 2014

(30) Foreign Application Priority Data

May 11, 2012 (RU) .................. 2012118994

(51) Int. Cl.
G06F 21/56 (2013.01)
(52) U.S. Cl.
CPC ............ *G06F 21/564* (2013.01); *G06F 21/565* (2013.01)
USPC ..................... 726/24; 726/22; 726/23; 726/25
(58) Field of Classification Search
CPC .............................. G06F 21/56; G06F 21/567
USPC ...................................................... 726/22–25
See application file for complete search history.

(56) References Cited

U.S. PATENT DOCUMENTS

| 7,836,500 | B2 | 11/2010 | Nason et al. | |
| 8,196,201 | B2 | 6/2012 | Repasi et al. | |
| 8,214,905 | B1 | 7/2012 | Doukhvalov et al. | |
| 8,332,946 | B1 * | 12/2012 | Boisjolie et al. | 726/24 |
| 8,347,386 | B2 * | 1/2013 | Mahaffey et al. | 726/23 |
| 2008/0133540 | A1 | 6/2008 | Hubbard et al. | |
| 2008/0184371 | A1 | 7/2008 | Moskovitch et al. | |
| 2009/0044024 | A1 * | 2/2009 | Oberheide et al. | 713/188 |
| 2011/0047620 | A1 * | 2/2011 | Mahaffey et al. | 726/23 |
| 2011/0225655 | A1 | 9/2011 | Niemela et al. | |
| 2012/0227105 | A1 * | 9/2012 | Friedrichs et al. | 726/22 |
| 2012/0330801 | A1 * | 12/2012 | McDougal et al. | 705/32 |
| 2013/0160126 | A1 * | 6/2013 | Kapoor et al. | 726/24 |

OTHER PUBLICATIONS

"Panda Cloud Antivirus Support Forums" © 2009 Panda Security (3 pages) http://www.cloudantivirus.com/forum/thread.jspa?threadID=51101&tstart=0.*

"The Immunet™ Edge Technology Brief" © 2011 Sourcefire Inc. (4 pages) https://na8.salesforce.com/sfc/p/80000000dRH9QwYigCR90Ql39dx6wrObn3O6p68=.*

* cited by examiner

*Primary Examiner* — Joseph P Hirl
*Assistant Examiner* — Thomas Gyorfi
(74) *Attorney, Agent, or Firm* — Arent Fox LLP; Michael Fainberg (57) ABSTRACT

Disclosed are systems, methods and computer program products for detecting computer malware. In one example, a security server receives information about a suspicious software object detected by a client computer using one or more malware detection methods. The server identifies the malware detection methods used to detect the suspicious object, and selects one or more different malware detection methods to check whether the suspicious object is malicious or clean. The server analyzes the suspicious object using the selected one or more different malware analysis methods to check whether the object is malicious or clean. If the object is determined to be malicious, the server generates and sends to the client computer detection instructions specific to the one or more malware detection methods used by the client computer for detecting and blocking the malicious object on the client computer.

17 Claims, 7 Drawing Sheets

SYSTEM AND METHOD FOR CLOUD-BASED DETECTION OF COMPUTER MALWARE

CROSS-REFERENCE TO RELATED APPLICATIONS

This application claims benefit of priority under 35 U.S.C. 119(a)-(d) to a Russian Application No. 2012118994 filed on May 11, 2012, which is incorporated by reference herein.

TECHNICAL FIELD

The present disclosure generally relates to the field of computer security, and specifically to cloud-based systems, methods and computer program products for detection of computer malware.

BACKGROUND

The antivirus industry is constantly challenged by virus writers at technical and system levels. Any methods and systems for detection of malware developed by the antivirus industry are analyzed by virus writers in order to circumvent or block these security systems. Thus, a constant battle rages in the antivirus industry between attackers and defenders. Antivirus experts analyze malware code and create antivirus programs. Virus writers analyze antivirus programs and create new malicious code that is immune to the antivirus programs. Such battles are typical in other technology areas. For example, cryptographers and cryptanalysts as well as hackers and system administrators conduct similar battles. However, in some technical areas, such battles are almost over. For example, cryptographic industry has developed a very strong public/private key encryption, which is almost impregnable.

Modern antivirus programs used on personal computers, such as desktops, notebooks, tablets, etc. often use different malware analysis methods, most common of which are signature matching, heuristic analysis, and behavior analysis, for detecting and blocking malicious programs and objects, such as files, network packets, application data, etc. Generally, these methods analyze different parameters and aspects of operation of malware and are quite reliable in detecting known and sometimes unknown types of malware. However, rarely, an antivirus application employ several different malware detection techniques at the same time to analyze objects for presence of malware due to time constraints imposed by computer users as well as processing complexity and system resource consumption required by some of these detection methods. Moreover, users often forget to update malware database used by the antivirus applications, which may cause the applications to miss new types of malware.

Accordingly, there is a need for a centralized system for detection of malware that can be used to assist client-based antivirus applications in detection of new types of malware.

SUMMARY

Disclosed are systems, methods and computer program products for cloud-based detection of computer malware. Particularly, a cloud-based security server is provided to assist client-based antivirus applications in analysis of suspicious software objects using different malware detection methods. In one example embodiment, the security server receives information about a suspicious software object detected by a client computer using one or more malware detection methods. The server identifies the malware detection methods used to detect the suspicious object, and selects one or more different malware detection methods to check whether the suspicious object is malicious or clean. In one example implementation, different malware detection methods may be selected from a signature matching method, a behavior analysis method, a script emulation method, an executable file emulation method, a checksum analysis method, a network address filtering method, and a network path filtering method, etc. The server then analyzes the suspicious object using the selected one or more different malware analysis methods to check whether the object is malicious or clean. If the object is determined to be malicious, the server generates and sends to the client computer detection instructions specific to the one or more malware detection methods used by the client computer for detecting and blocking the malicious object on the client computer.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

DEFINITIONS

Malicious object—a file, an executable file, a process, an HTTP stream, a network resource address, and a network object path, which are detected by antivirus application.

Signal indicating suspicious activity—network packets sent to the cloud server by the analyzing module when a suspicious object or activity is detected on the client computer.

Signal blocking malicious activity—network packets sent from the cloud server to the client computer that contains data for blocking module.

Analyzing module—detection module that performs a malware detection method on an object and generates and sends to the cloud server a signal indicating suspicious activity.

Blocking module—detection module that blocks malicious object or its activity on a client computer based on a signal blocking malicious activity received from the cloud server.

Cloud—one or more network servers that receive signals indicating suspicious activity from the information detection module and creates blocking signals, which are sent to client computers connected to the cloud. The term "cloud" is a paradigm of a sophisticated server infrastructure, which hides its technical implementation from client computers.

Cloud computing—a paradigm in which information is permanently stored on servers on the Internet and temporarily cached on the client computers, for example, personal computers, game consoles, laptops, smart phones and so on. Cloud computing includes such concept as "Everything as a Service", "Infrastructure as a Service", "Platform as a Service", "Software as a Service", "Workplace as a Service", "Database as a Service", and other services.

It is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

BRIEF DESCRIPTION OF THE DRAWINGS

The accompanying drawings, which are incorporated into and constitute a part of this specification, illustrate one or more example embodiments of the invention and, together with the detailed description, serve to explain their principles and implementations.

In the drawings.

DETAILED DESCRIPTION OF EXAMPLE EMBODIMENTS

Example embodiments of the present invention are described herein in the event context of systems, methods and computer program products for cloud-based malware detection. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

In one example embodiment, the malware detection system includes an antivirus application deployed on user's computer and a remote, cloud server. In one aspect, the antivirus application includes a plurality of analyzing modules and blocking modules. The antivirus application determines which modules are analyzing and which are blocking, and provides a mechanism for interaction between analyzing and blocking modules based on the rules of interaction stored in the cloud server. In one aspect, analyzing modules may have functionality of blocking modules and vice versa. In one example embodiment, the cloud server performs different malware detection methods to supplement those used by the antivirus application. The malware detection methods used by the server are hidden by the cloud infrastructure and cannot be easily analyzed or circumvented by malware writers.

In one example embodiment, the antivirus application may include one or more different analyzing modules that analyze software objects on the user's computer for presence of malware using different malware detection methods. These methods include, but not limited to: signature matching method, a behavior analysis method, a script emulation method, an executable file emulation method, a checksum analysis method, a network address filtering method, and a network path filtering method. If an analyzing module determines that the analyzed software object is malicious or suspicious, it can collect information about the object and send it, using a signal indicating suspicious activity, to the cloud server for checking.

In one example embodiment, the cloud server also contains one or more analyzing modules that perform different malware detection methods. These methods include, but not limited to: signature matching method, a behavior analysis method, a script emulation method, an executable file emulation method, a checksum analysis method, a network address filtering method, and a network path filtering method. The cloud server also stores interaction rules that associate client-side analyzing modules with the server-side analyzing modules, so that cloud server can perform different malware detection methods from those performed by the antivirus application on the user's computer in order to check whether the suspicious object detected by the antivirus application is malicious or clean.

In one example embodiment, results of the antivirus analysis of the suspicious object collected from one or more server-side analyzing modules are classified based on compatibility with one or more blocking modules on the client side. The classification is performed based on algorithms specified in the interaction rules. Thus, based on a signal indicating suspicious activity from the antivirus application, the cloud server performs analysis of the suspicious object using different malware detection methods and generates a comprehensive solution for blocking the malicious object on the user computer. This solution can include a set of attributes that can be used by the blocking modules of the antivirus application to identify and block a malicious object on the user's computer.

There are number of advantages of the disclosed malware detection system. First, the specific implementation of the server-side analysis of suspicious objects using different malware detection methods is hidden by the cloud infrastructure and cannot be easily analyzed by hackers. Second, the cloud server performs thorough analysis of the suspicious objects using one or more different malware detection methods, which improves likelihood of the correct determination of whether the tested software object is in fact malicious or clean. In one example implementation, these modules may include, but not limited to: signature scanner, behavior analyzer, script emulator, executable file emulator, checksum analyzer, network address filter, and a network path filter. Table below describes functions of these modules.

| Analyzing modules | Objects of detection | Methods of detection |
|---|---|---|
| Signature scanner | File | Binary comparison of a code-based signature of the tested file with signatures of known clean or malicious files stored in a whitelist and blacklists. |
| Behavior analyzer | Process | Comparison of API function calls of the tested process with parameters of known clean or malicious processes. |
| Script emulator | HTTP data stream | Comparison of API function calls of an emulated Web script received via HTTP from a website with parameters of known clean or malicious Web scripts. |
| Executable file emulator | Executable file | Comparison of API function calls of an emulated executable file with parameters of behavior signatures. |
| Checksum analyzer | File | Comparison of file's hash sum with hash sums of known clean or malicious files |

-continued

| Analyzing modules | Objects of detection | Methods of detection |
|---|---|---|
| Network address filter | Address of a network resource | Comparison of the address of a network resource with the network addresses of known clean or malicious resources. |
| Network path filter | Transmission path of a network resource | Binary comparison of transmission path of a network resource with paths of known clean or malicious resources. |

Figure 1:
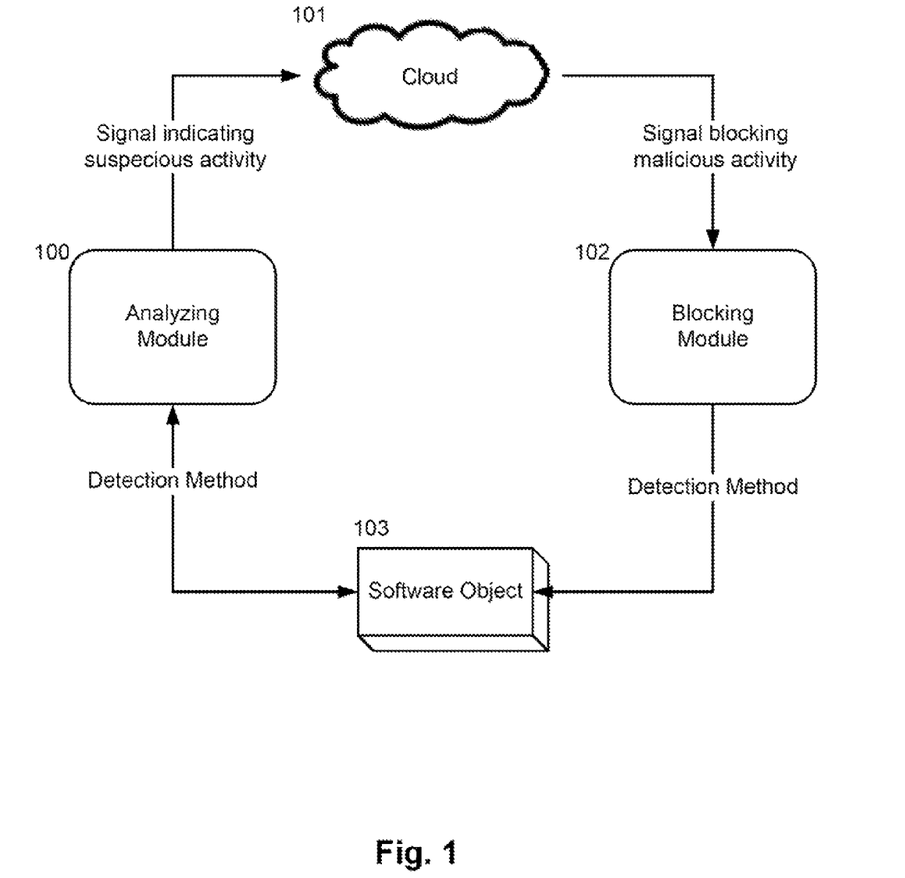
FIG. 1 illustrates one example embodiment of the malware detection system.

FIG. 1 illustrates example embodiment of the malware detection system. The client side of the system includes an antivirus application comprising one or more analyzing modules 100, such as behavior analyzer, which monitors API function calls (and their parameters) of various software objects 103 (e.g., programs) being executed on the user's computer and compares them with parameters of known clean or malicious processes. If the behavior analyzer 100 cannot conclusively (e.g., with 90% degree of certainty) determine if a monitored software object 103 is clean or malicious, but the object is suspicious because it exhibits some degree of malicious behavior (e.g., 50% degree of malicious behavior), then, in one aspect, the behavior analyzer 100 may collect all available information about the behavior of the suspicious object 103 and send, via a signal indicating suspicious activity, the collected information to the cloud server 101 for checking whether the object is malicious or clean.

The cloud server 101 in turn may use different detection modules to perform one or more supplemental malware analysis methods (i.e., other than the behavior analysis method) on the suspicious object in order to collect additional information about the object that can be used to confirm whether the object is in fact clean or malicious. The additional information may include, but not limited to the list of network addresses from which the suspicious object was downloaded, results of the emulation of the object, list of addresses to which the object tried to connect during its execution, etc. If, for example, the suspicious object exhibits behavior of a network worm, then cloud server 101 can collect information about network behavior during emulation of the object in script emulator and compare it with behaviors of known network worms. When the cloud server 101 confirms, based on the collected information, that the object is in fact malicious, server 101 can classify the collected information based on its compatibility with one or more blocking modules 102 of the antivirus application. The compatible information is information that can be processed by the blocking module 102. The information classified as being compatible with one or more blocking modules 102 is sent by the cloud server 101 in a form of a blocking signal to the one or more blocking modules 102 of the antivirus application deployed on the user's computer.

The blocking modules 102 of the antivirus application perform treatment of the malicious objects on the user's computer using information received via the blocking signal from the cloud server 101. Specifically, different blocking modules 102 receive different information from the cloud server: Blocking module of the signature scanner may receive signatures of malicious objects. Blocking module of the behavior analyzer may receive new malicious behavior scenarios. Blocking module of the script emulator may receive sequences of API function calls of malicious Web scripts. Blocking module of the executable file emulator may receive malicious behavior models comprising sequences of API function calls of malicious programs. Blocking module of the checksum analyzer may receive hash sums of malicious object. Blocking module of the network address filter may receive network addresses of the malicious object. Blocking module of the network path filter may receive network binary representation of the transmission path of the malicious object. The information received from the cloud server 101 may be stored in a database of the antivirus application.

The example above illustrates general principles of operation of the malware detection system. Following are several specific examples of operation of the system.

Figure 2:
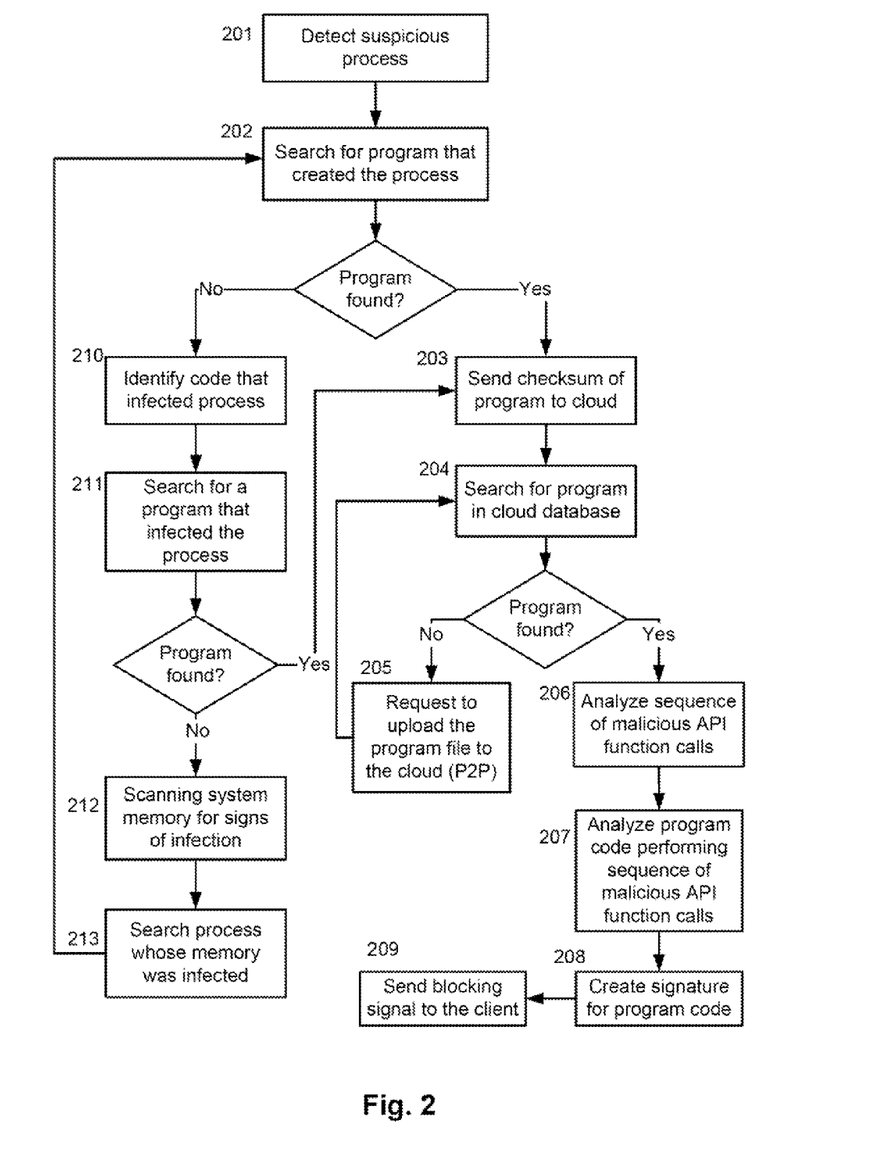
FIG. 2 illustrates one example implementation of a malware detection method.

FIG. 2 shows one example implementation of the malware detection process in which the client-side analyzing module is behavior analyzer, the object of detection is a process, the blocking module is a signature scanner, and the object of detection is a program. At step 201, the behavior analyzer of the antivirus application detects a process that exhibits suspicious activity. For example, the behavior analyzer may find a match between several API function calls made by the monitored process and one of the sequence of known malicious API function calls stored in the database of the behavior analyzer. At step 202, the behavior analyzer may search in the memory or storage of the user's computer for the program that created the suspicious process. If the program is found, the behavior analyzer may create a checksum (e.g., hash sum, or the like) of the program and send it, at step 203, to the cloud server as a signal indicating suspicious activity. At step 204, a cloud server may search in the cloud databases for the program using its checksum. If the program is not found in the cloud database, the cloud server may request that the user's computer sends the program to the server using, for example, a point-to-point (P2P) protocol, at step 205. If the program is found in the cloud database, than, at step 206, the server may use a different analyzing module to analyze sequence of API function calls made by the program. At step 207, the server may also use a different analyzing module to analyze code of the program that performs malicious actions. At step 208, the server may use a different analyzing module to create a code-based signature for the program that identifies malicious program code of the program. At step 209, the server may send to the antivirus application a blocking signal with the signature of the malicious program, which can be used by the antivirus application to detect and block the malicious program on the user's computer. If, at step 202, the behavior analyzer of the antivirus application did not find on the user's computer a program that created the suspicious process, then, at step 210, behavior analyzer may try to identity malicious code that infected the process, and, at step 211, search for a program that infected the process with malicious code. If the infectious program is found, than the behavior analyzer may send a checksum of the infectious program to the cloud, at step 203, for further processing as explained above. If the infectious program was not found on the user's computer, at step 212, the behavior analyzer may scan system memory for signs of infection of the suspicious process. At step 213, behavior analyzer searches process in memory of which infection was performed. And, the processing continues at step 202, in which the behavior analyzer may search in the memory or storage of the user's computer for the program that created the suspicious process.

Figure 3:
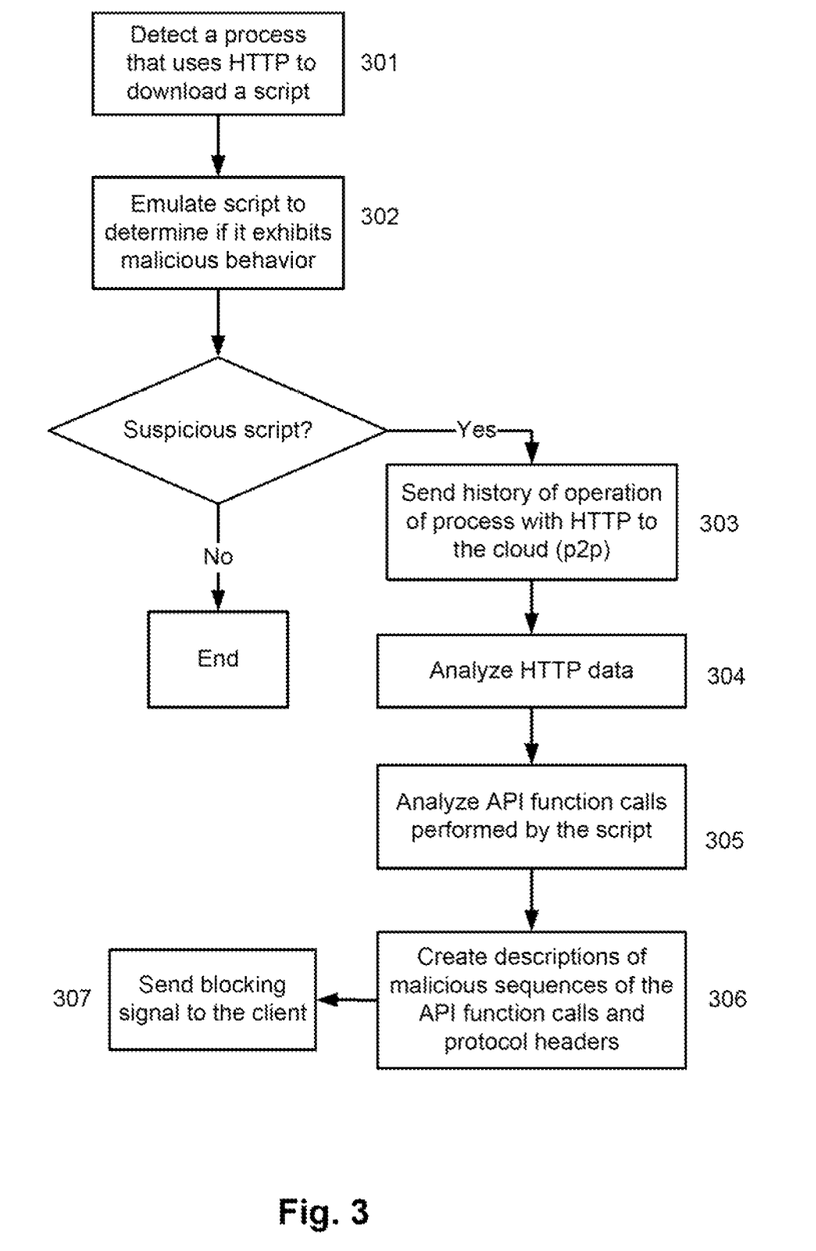
FIG. 3 illustrates another example implementation of the malware detection method.

FIG. 3 shows another example implementation of the malware detection process in which the client-side analyzing module is a behavior analyzer, the object of detection is a process, the blocking module is a script emulator, and the object of detection is a Web script transmitted using HTTP. At step 301, the behavior analyzer of the antivirus application detects a process requests download of a Web script using HTTP from a website. At step 302, the antivirus application may use script emulator to emulate the requested script and determine if it exhibits any malicious activity. For example, the script emulator may find a match between several API function calls made by the script and one of the sequence of known malicious API function calls stored in the database of the script emulator. If the script is determined to be suspicious, then, at step 303, the behavior analyzer may collect information about the suspicious script, including, for example, history of the process that activated the script, source address of the script, etc., and send it to the cloud server as a signal indicating suspicious activity via, for example, a FTP, HTTP or P2P protocol. At step 304, the cloud server may use a different analyzing module to analyze the HTTP headers and other HTTP transmission information used to transfer of the suspicious script from the Internet. At step 305, a different analyzing module may be used to search for sequences of malicious API calls of the suspicious script. At step 306, the cloud server creates descriptions of malicious sequences of the API function calls and protocol headers associated with the suspicious script. At step 307, the server may send to the antivirus application a blocking signal with the created description of the malicious sequences of API function calls and protocol headers of the malicious script, which can be used by the antivirus application to detect and block the malicious script on the user's computer.

Figure 4:
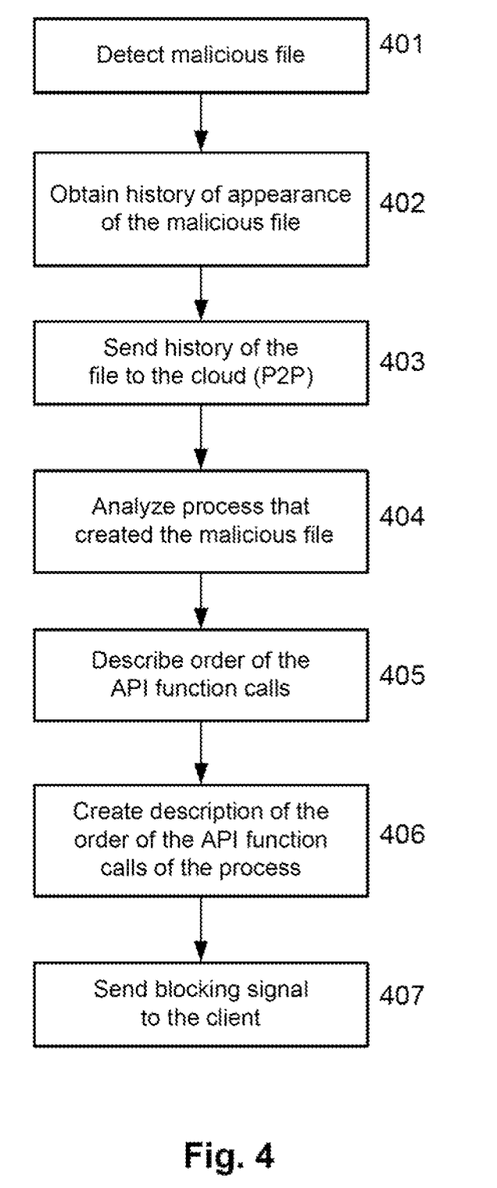
FIG. 4 illustrates another example implementation of the malware detection method.

FIG. 4 shows another example implementation of the malware detection process in which the client-side analyzing module is a checksum analyzer, the object of detection is a file, the blocking module is a behavior analyzer, and the object of detection is a process. At step 401, the checksum analyzer of the antivirus application computes and compares checksums of files on the user's computer with checksums of malicious files. If a malicious file is detected, the antivirus application collects, at step 402, from the behavior analyzer a history of appearance of the malicious file on the user's computer, including, information about a process that launched/created the malicious file and the sequence of API function calls of that process. At step 403, the antivirus application sends the collected information to the cloud server as a signal indicating suspicious activity via, for example, a FTP, HTTP or P2P protocol. At step 404, the cloud server users one of the analyzing modules to analyze the working of the process, based on its sequence of API function call, which resulted in launching of the malicious file. At step 405, the cloud server creates a description of the sequence of the API function calls. At step 406, the cloud server creates a description of the sequence of the API function calls of the process. At step 407, the cloud server may send to the antivirus application a blocking signal with the created sequences, which can be used by the blocking module of the behavior analyzer to block processes that launch/create the malicious file on the user's computer.

Figure 5:
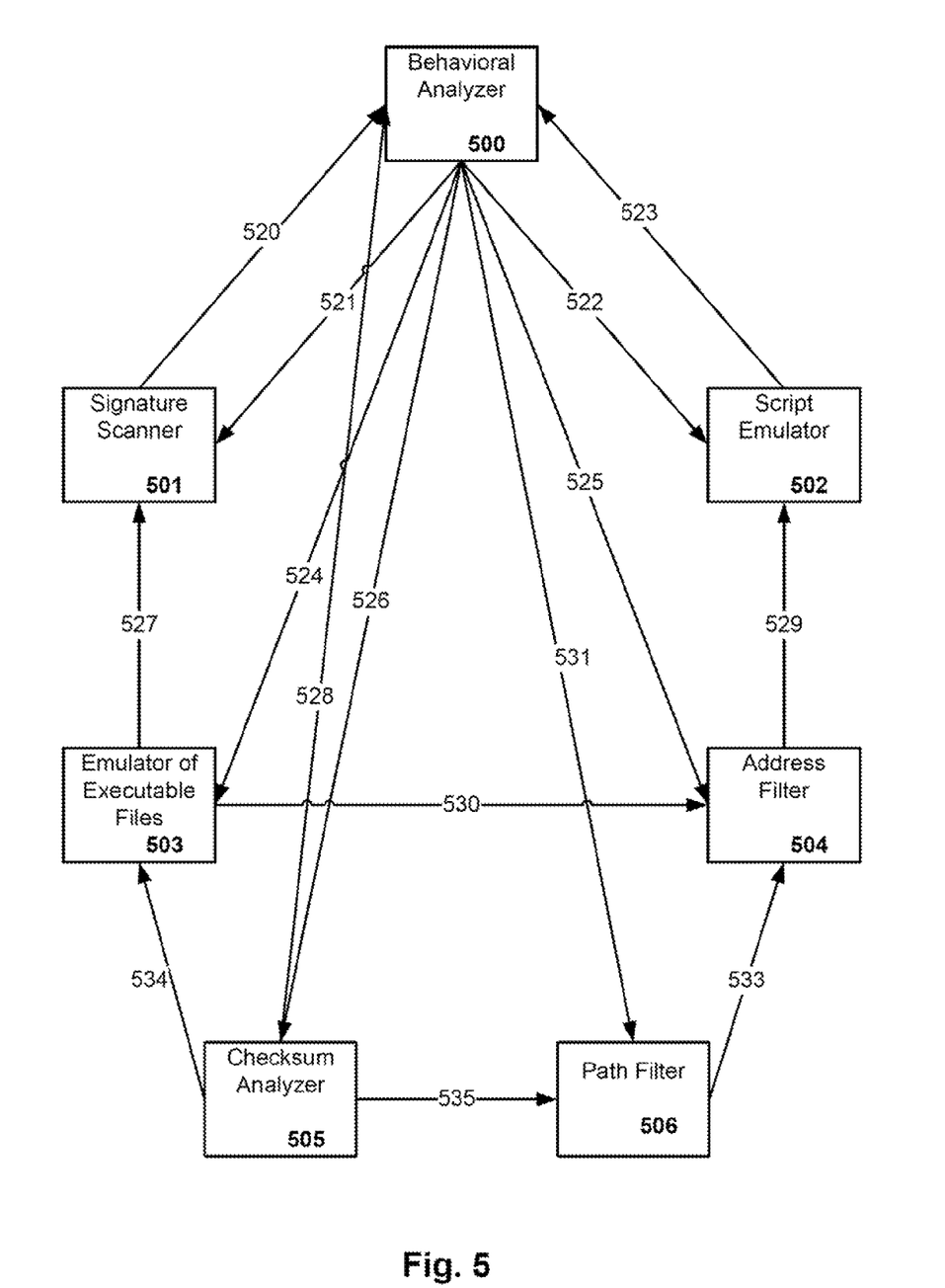
FIG. 5 illustrates a graph of example interaction between malware detection modules.

FIG. 5 illustrates an example algorithm of interaction between different modules of the malware detection system. In the drawing, blocks from which line connectors begin represent analyzing modules, and blocks where line connectors end represent blocking modules. The analyzing modules may be located either on the client side as part of the antivirus application or on a cloud server. Line connectors represent signals transmitted to and from these modules. Lines going out of the modules represent signals indicating suspicious activity. Lines coming into the modules represent signals blocking malicious activity.

In one aspect, analyzing module of behavior analyzer 500 sends to the cloud, via signal 521, information about sequences of API function calls of a suspicious file. The cloud server analyzes this information and sends a blocking signal 521, which contains code-based signatures of the malicious file, to the blocking module of signature scanner 501, which can save received information in a local database on the user's computer. Via signal 524, the cloud receives a description of operation of a suspicious process in an emulator, and sends a blocking signal 524, which contains scenarios of malicious behavior, to the blocking module of the emulator of executable files 503. Via signal 526, the cloud receives information about a file that created a malicious process, and sends a blocking signal 526, which contains a checksum of the file, to the blocking module of the checksum analyzer 505. Via signal 531, the cloud receives information about addresses of network resources identified in the history of operation of a suspicious process, and sends this information via blocking signal 531 to the blocking module of path filter 506. Via signal 525, the cloud receives information about network addresses identified in the history of operation of a suspicious process, and sends this information via blocking signal 525 to the blocking module of address filter 504. Via signal 522, the cloud receives information about behaviors of malicious Web scripts transmitted using HTTP, and sends this information via blocking signal 522 to the blocking module of script emulator 502.

In another aspect, analyzing module of signature scanner 501 sends to the cloud, via signal 520, code-based signature of a malicious file and related process. The cloud analyzes the process that created the malicious file, and sends, via blocking signal 520, a sequence of API function calls that characterize malicious behavior of the process to the blocking module of the behavior analyzer 500, which can store it in a local database on the user's computer.

Yet in another aspect, analyzing module of emulator of executable files 503 sends to the cloud, via signal 527, sequence of API function calls that characterize malicious behavior of a file. The cloud downloads this malicious file and generates a code-based signature of the file. This signature is send, via blocking signal 527, to the blocking module of signature scanner 501, which stores the received signature in a local database on the user's computer. In addition, from signal 530, from the analyzing module of the emulator of executable files 503, the cloud can generate a list of network addresses accessed during operation of the malicious file, and send this list via blocking signal 530 to the blocking module of address filter 504, which can store the list in a local database on the user's computer.

In another aspect, analyzing module of checksum analyzer 505 identifies matches of checksums of monitored files with checksums of malicious files, and if match is found sends to the cloud, via signal 534, the identified malicious file. The cloud analyzed the file and generates a scenario of malicious behavior of the file, which it sends, via signal 534, to the blocking module of the emulator of executable files 503. In addition, from signal 528, the cloud can generate a description of operation of a process that created the malicious file, and send this information, via blocking signal 528 to the blocking module of behavior analyzer 500. In addition, from signal 532, the cloud can receive network address of the identified malicious. The cloud generates a list of network address where this file is located, sends this list via blocking signal 532 to the blocking module of path filter 406, which will block future attempts to access these addresses. This list can store in a local database on the user's computer.

Yet in another aspect, analyzing module of path filter 506 performs binary comparison of a transmission path with addresses of malicious resources, and sends this information to the cloud via signal 533. The cloud generates a list of addresses of network resources associated with the transmission path, and sends this information, via blocking signal 533 to the blocking module of address filter 504, which stores it in a local database.

In another aspect, analyzing module of address filter 504 performs comparison of addresses of network resources with addresses of malicious resources, and sends results of the comparison to the cloud via signal 529. The cloud generates a description of behaviors of malicious Web scripts associated with identified network resources, and sends them via blocking signal 529 to the blocking module of script emulator 502. The emulator 502 stores information about malicious Web scripts in a local database on the user's computer.

Yet in another aspect, analyzing module of the script emulator 502 detects a malicious Web script and process that activated it, and sends this information to the cloud via signal 523. The cloud analyzed the process and generates a sequence of API function calls that characterize malicious behavior of the process that loaded the Web script. The cloud then sends information about sequence of malicious API function calls via blocking signal 523 to the blocking module of behavior analyzer 500, which stores this information in a local database.

Figure 6:
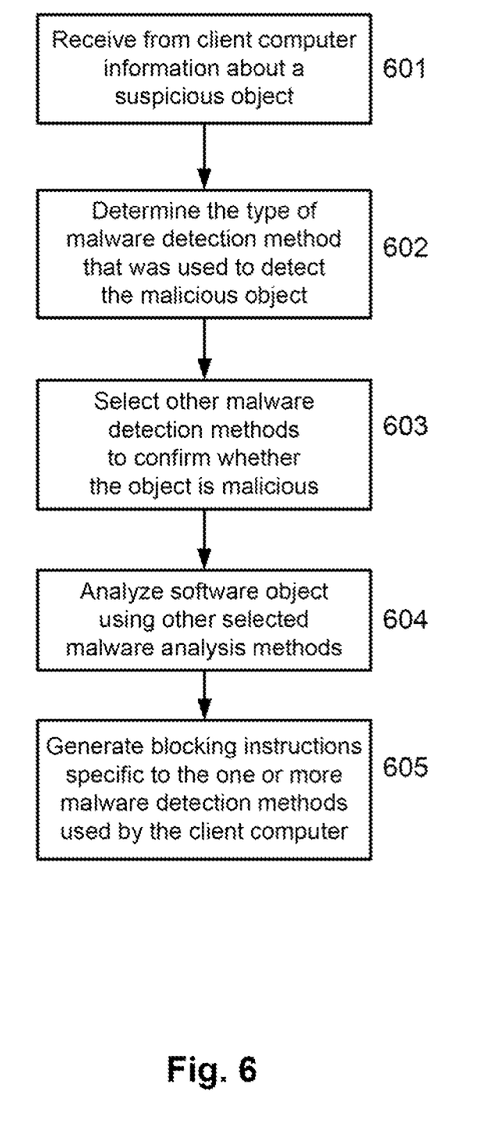
FIG. 6 is another example implementation of the malware detection method.

FIG. 6 shows another example implementation of the malware detection process performed by the cloud server. At step 601, the cloud server receives from client computer information about a suspicious object. At step 602, the cloud server determine, e.g., based from the received information, the type of malware detection method that was used to detect the malicious object on the client computer. At step 603, the cloud server selects one or more different malware detection methods to check whether the object is malicious. At step 604, the cloud server analyzes the software object using selected malware analysis methods. At step 605, the cloud server generates and sends to the client computer blocking instructions, which are specific to the one or more malware detection methods used by the client computer for detecting and blocking the software object using the specified malware detection methods.

Figure 7:
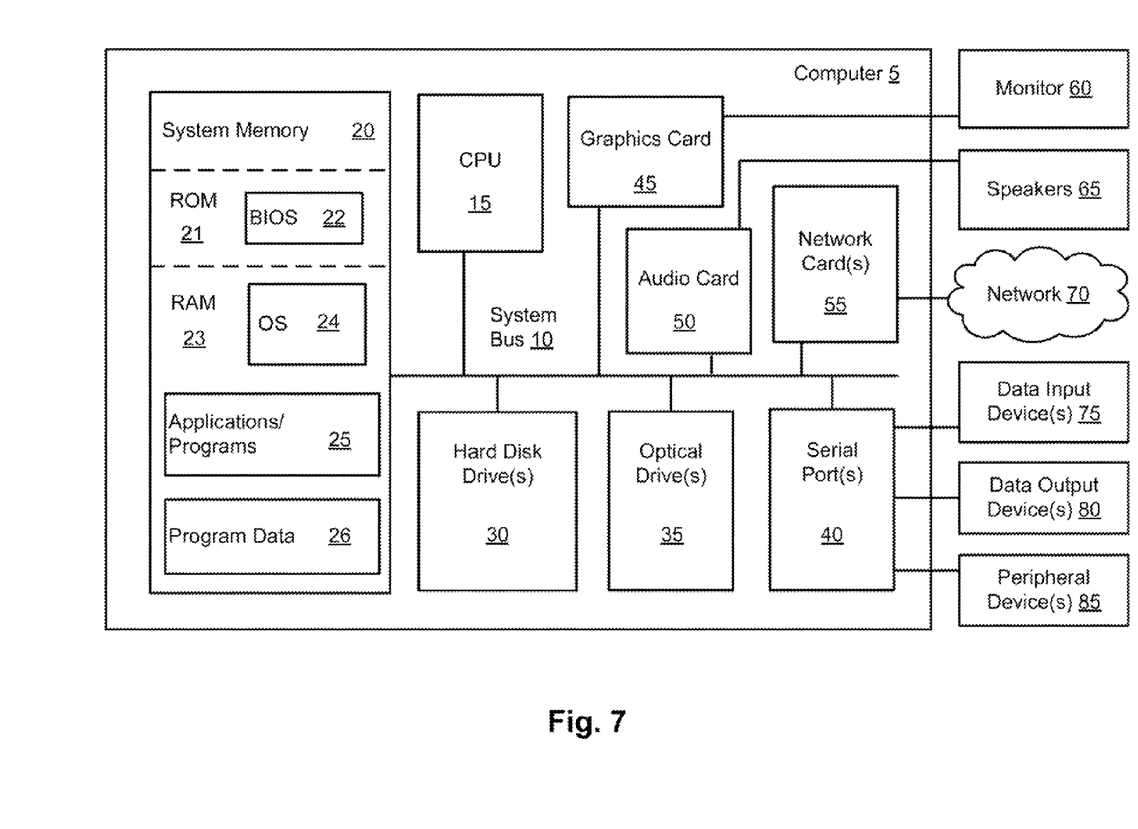
FIG. 7 illustrates a block diagram of a general-purpose computer suitable for implementing the malware detection systems and methods disclosed herein.

FIG. 7 is an example embodiment of a computer system 5, which could be used to implement the system and methods for adaptive control of user actions described herein. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various embodiments, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a computer.

In the interest of clarity, not all of the routine features of the embodiments are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

The invention claimed is:

1. A method for detecting and blocking computer malware, the method comprising:
   receiving by a security server information about a suspicious software object detected on a client computer using one or more malware detection methods;
   identifying, from the received information, the one or more malware detection methods used to detect the suspicious object on the client computer wherein the malware detection methods used on the client computer, wherein the malware detection methods used on the client computer include one or more methods selected from a behavior analysis method, a script emulation method, an executable file emulation method, a network address filtering method, and a network path filtering method;
   selecting a different malware detection method to check whether the suspicious object is malicious or clean, the different malware detection method including a different method selected from a signature matching method, a behavior analysis method, a script emulation method, an executable file emulation method, a checksum analysis method, a network address filtering method, and a network path filtering method, wherein selecting includes applying interaction rules that associate one or more malware detection methods used to detect the suspicious object on the client computer with the one or more different malware detection methods used on the security server,
   analyzing the suspicious object using the selected one or more different malware detection methods on the security server to check whether the object is malicious or clean; and
   when the object is determined to be malicious, classifying results of the analysis based on compatibility with one or more malware blocking methods used on the client computer, wherein the one or more malware blocking methods differ from the one or more malware detection methods used to detect the suspicious object on the client computer, and generating by the security server blocking instructions specific to the one or more compatible malware blocking methods used on the client computer for blocking the malicious object on the client computer.

2. The method of claim 1, wherein the security server is located in a cloud infrastructure and the malware detection methods by which the security server analyzes the suspicious object are hidden by the cloud infrastructure and unknown to potential infiltrators.

3. The method of claim 1, wherein the blocking instructions for the signature matching method used on the client computer include at least a code-based signature of the malicious object.

4. The method of claim 1, wherein the blocking instructions for the behavior analysis method used on the client computer include at least malicious sequences of API function calls.

5. The method of claim 1, wherein the blocking instructions for the script emulation method used on the client computer include at least behaviors of malicious Web scripts.

6. The method of claim 1,
   wherein the blocking instructions for the checksum analysis method used on the client computer include at least a checksum of the malicious object;
   wherein the blocking instructions for the network address filtering method used on the client computer include at least a network address the malicious object; and
   wherein the blocking instructions for the network path filtering method used on the client computer include at least a binary representation of the network path of the malicious object.

7. A system for detecting and blocking computer malware, the system comprising:
   a server computer having a hardware processor configured to:
      receive information about a suspicious software object detected on a client computer using one or more malware detection methods;
      identify, from the received information, the one or more malware detection methods used to detect the suspicious object on the client computer wherein the malware detection methods used on the client computer, wherein the malware detection methods used on the client computer include one or more methods selected from a behavior analysis method, a script emulation method, an executable file emulation method, a network address filtering method, and a network path filtering method;
      select a different malware detection method to check whether the suspicious object is malicious or clean, the different malware detection method including a different method selected from a signature matching method, a behavior analysis method, a script emulation method, an executable file emulation method, a checksum analysis method, a network address filtering method, and a network path filtering method, wherein selecting includes applying interaction rules that associate one or more malware detection methods used to detect the suspicious object on the client computer with the one or more different malware detection methods used on the security server,
      analyze the suspicious object using the selected one or more different malware detection methods on the security server to check whether the object is malicious or clean; and
      when the object is determined to be malicious, classify the results of the analysis based on compatibility with one or more malware blocking methods used on the client computer, wherein the one or more malware blocking methods differ from the one or more malware detection methods used to detect the suspicious object on the client computer, and generating by the security server blocking instructions specific to the one or more compatible malware blocking methods used on the client computer for blocking the malicious object on the client computer.

8. The system of claim 7, wherein the security server is located in a cloud infrastructure and the malware detection methods by which the security server analyzes the suspicious object are hidden by the cloud infrastructure and unknown to potential infiltrators.

9. The system of claim 7, wherein the detection instructions for the signature matching method used on the client computer include at least a code-based signature of the malicious object.

10. The system of claim 7, wherein the detection instructions for the behavior analysis method used on the client computer include at least malicious sequences of API function calls.

11. The system of claim 7, wherein the detection instructions for the script emulation method used on the client computer include at least behaviors of malicious Web scripts.

12. The system of claim 7,
wherein the blocking instructions for the checksum analysis method used on the client computer include at least a checksum of the malicious object;
wherein the blocking instructions for the network address filtering method used on the client computer include at least a network address the malicious object; and
wherein the blocking instructions for the network path filtering method used on the client computer include at least a binary representation of the network path of the malicious object.

13. A computer program product embedded in a non-transitory computer-readable storage medium, the computer program product comprising computer-executable instructions for detecting and blocking computer malware, including instructions for:
receiving by a security server information about a suspicious software object detected on a client computer using one or more malware detection methods;
identifying, from the received information, the one or more malware detection methods used to detect the suspicious object on the client computer wherein the malware detection methods used on the client computer, wherein the malware detection methods used on the client computer include one or more methods selected from a behavior analysis method, a script emulation method, an executable file emulation method, a network address filtering method, and a network path filtering method;
selecting a different malware detection method to check whether the suspicious object is malicious or clean, the different malware detection method including a different method selected from a signature matching method, a behavior analysis method, a script emulation method, an executable file emulation method, a checksum analysis method, a network address filtering method, and a network path filtering method, wherein selecting includes applying interaction rules that associate one or more malware detection methods used to detect the suspicious object on the client computer with the one or more different malware detection methods used on the security server,
analyzing the suspicious object using the selected one or more different malware detection methods on the security server to check whether the object is malicious or clean; and
when the object is determined to be malicious, classifying results of the analysis based on compatibility with one or more malware blocking methods used on the client computer, wherein the one or more malware blocking methods differ from the one or more malware detection methods used to detect the suspicious object on the client computer, and generating by the security server blocking instructions specific to the one or more compatible malware blocking methods used on the client computer for blocking the malicious object on the client computer.

14. The product of claim 13, wherein the security server is located in a cloud infrastructure and the malware detection methods by which the security server analyzes the suspicious object are hidden by the cloud infrastructure and unknown to potential infiltrators.

15. The product of claim 13, wherein the detection instructions for the signature matching method used on the client computer include at least a code-based signature of the malicious object.

16. The product of claim 13, wherein the detection instructions for the behavior analysis method used on the client computer include at least malicious sequences of API function calls.

17. The product of claim 13, wherein the detection instructions for the script emulation method used on the client computer include at least behaviors of malicious Web scripts.

* * * * *

UNITED STATES PATENT AND TRADEMARK OFFICE
CERTIFICATE OF CORRECTION

| | | |
|---|---|---|
| PATENT NO. | : 8,875,294 B2 | Page 1 of 1 |
| APPLICATION NO. | : 13/749856 | |
| DATED | : October 28, 2014 | |
| INVENTOR(S) | : Golovanov | |

It is certified that error appears in the above-identified patent and that said Letters Patent is hereby corrected as shown below:

On the Title Page item [72] Inventor should read as:

[72] Inventor: Sergey Y. Golovanov

Signed and Sealed this
Third Day of February, 2015

Michelle K. Lee
*Deputy Director of the United States Patent and Trademark Office*

UNITED STATES PATENT AND TRADEMARK OFFICE
CERTIFICATE OF CORRECTION

Page 1 of 1

PATENT NO. : 8,875,294 B2
APPLICATION NO. : 13/749856
DATED : October 28, 2014
INVENTOR(S) : Golovanov It is certified that error appears in the above-identified patent and that said Letters Patent is hereby corrected as shown below:

On the Title Page item [12] should be corrected to read:

Golovanov

On the Title Page item [72] Inventor should read as:

[72] Inventor: Sergey Y. Golovanov

This certificate supersedes the Certificate of Correction issued February 3, 2015.

Signed and Sealed this
Third Day of March, 2015

Michelle K. Lee
*Deputy Director of the United States Patent and Trademark Office*